United States Patent Office 3,224,312
Patented Dec. 21, 1965

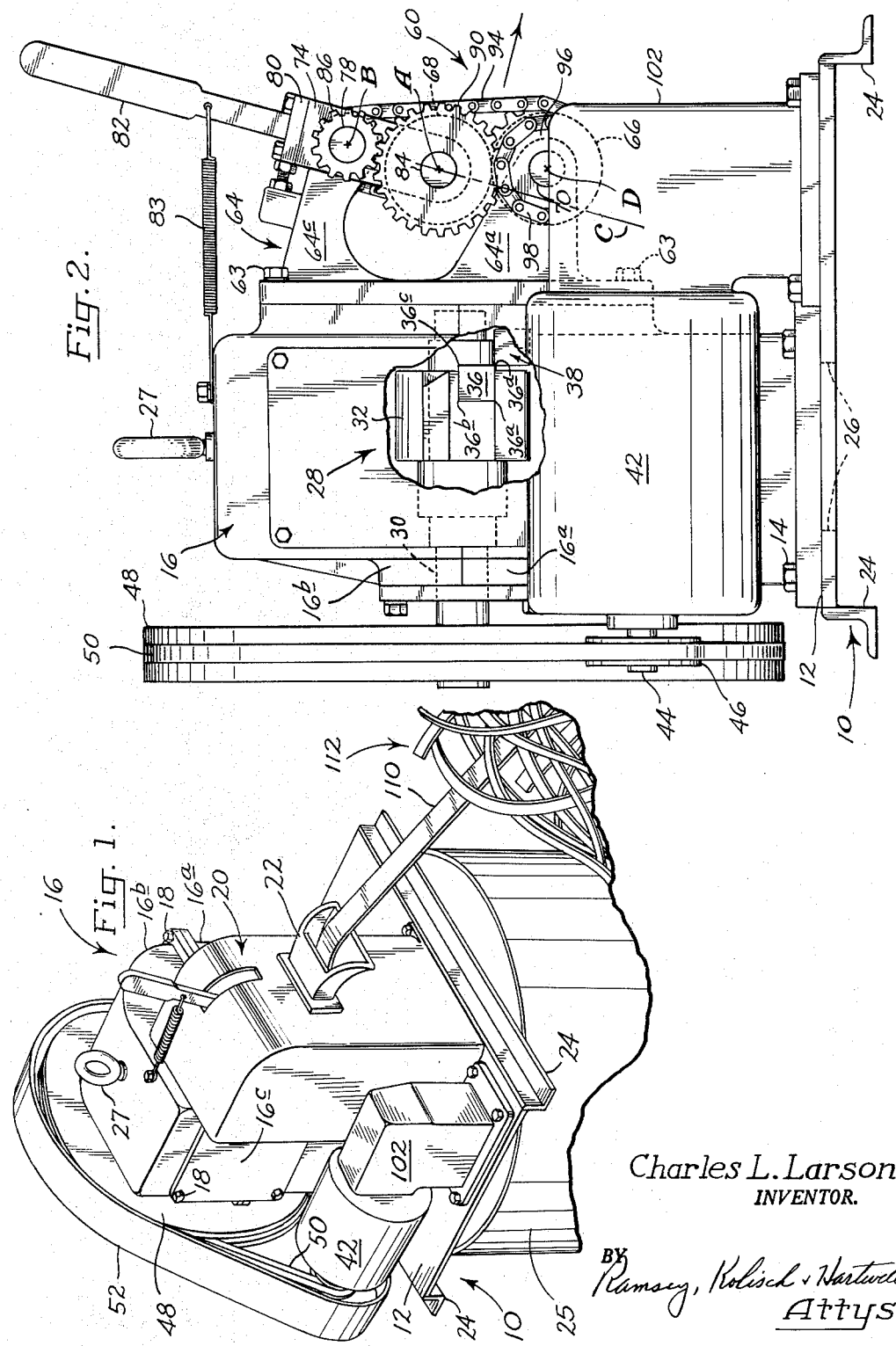

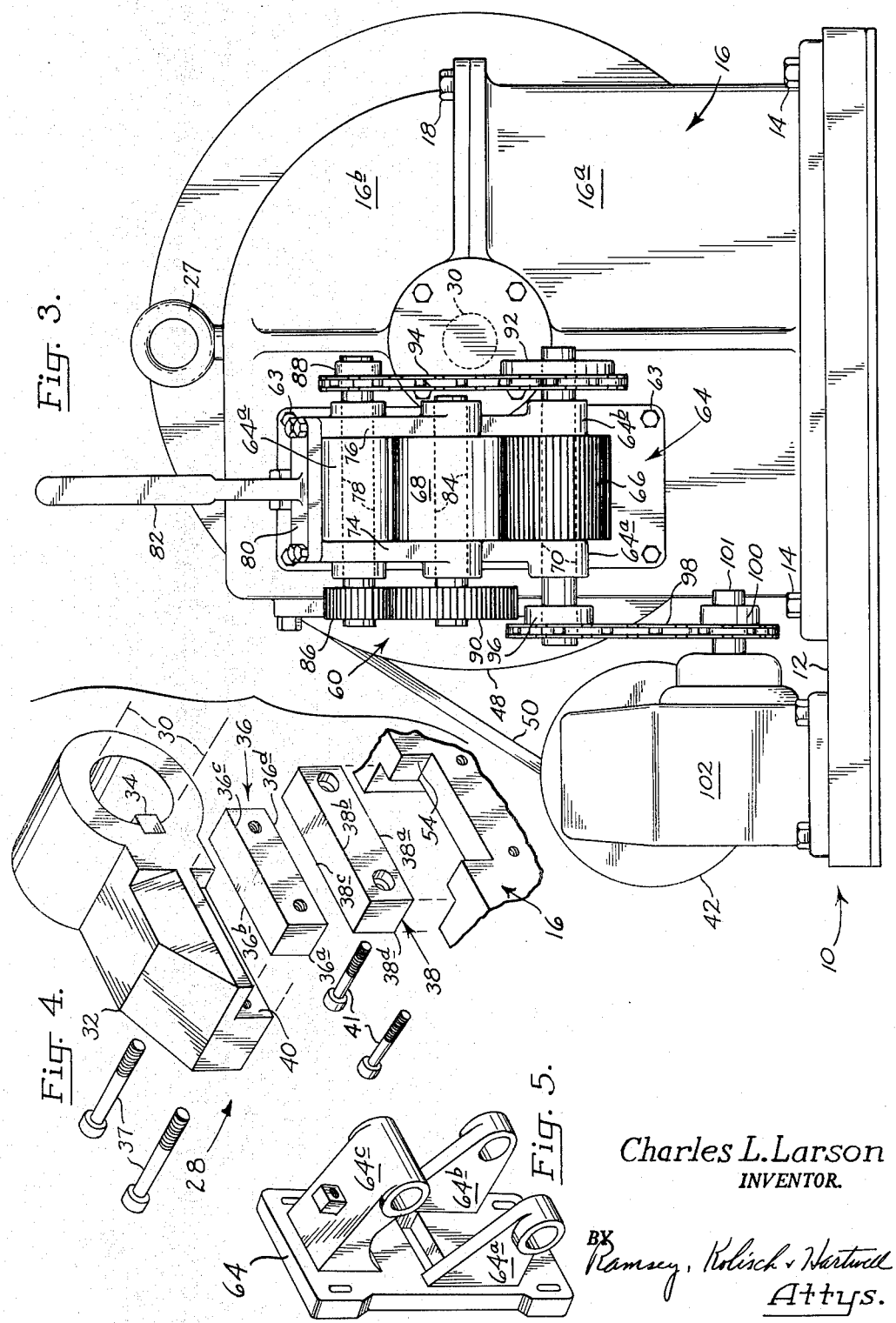

3,224,312
TIMED STOCK CUTTER WITH MULTIPLE EDGED KNIVES
Charles L. Larson, Grants Pass, Oreg., assignor to Jeddeloh Bros. Sweed Mills, Inc., Jackson, Oreg., a corporation of Oregon
Filed Sept. 9, 1963, Ser. No. 307,717
1 Claim. (Cl. 83—355)

This invention relates generally to cutter apparatus, and more particularly to apparatus of the type that may be used to cut elongated strips of stock into relatively short pieces, to facilitate subsequent handling and storing of the material.

In present day industrial operations, such as lumber yards, mills, warehouses, the transportation industry, etc., frequently materials are used which are delivered to the operation as a bundle bound together with elongated metal straps. These are cut to free the material from the bundle, leaving for suitable disposal the metal straps that formerly bound the bundle. In some operations, elongated metal strips may also be the product of a manufacturing process. Regardless of its origin, such material, because of its shape, is quite hard to handle, and often presents a considerable disposal problem.

This invention contemplates a novel stock cutter, which may be operated to cut or chop elongated strips of material into short pieces. Short pieces of metal strapping, unlike the original straps from which they are cut, may be easily collected in a barrel or other container, and the total bulk of the pieces is far less than the total bulk of the original strapping. Thus, whereas before cutting some 15 to 20 barrels may have been necessary to handle a given quantity of used strap, after cutting, one barrel may suffice, and this barrel may be filled far more easily. Obviously, therefore, when storing, moving, or otherwise disposing of such material, considerable economies are possible if the material is first reduced to cut up form.

Generally, an object of this invention is to provide an improved stock cutter, which is simple, entirely practical, and requires little maintenance.

Another object is to provide such a stock cutter which is easy to operate, including easy to feed with strap from the usual pile in which such strap is collected.

As already indicated, straps such as are used for packaging may comprise relatively long pieces which become twisted and entangled with other pieces after they are cut from packages. It has been noted that a considerable amount of the difficulty involved in cutting up strapping centers around the trouble that is usually involved in extracting strap from the waste pile in which the uncut strap is usually collected. To facilitate the handling of strap, this invention contemplates a cutter apparatus including cutter mechanism for cutting strap, and means disposed on the feed side of this cutter mechanism that performs at least the double function of (1) positively extracting a piece of strap from a pile that may contain a number of such pieces as a tangled mass, and (2) after extracting the piece of strap, feeding the strap into the cutter mechanism.

A feature of the invention is the provision of such means for extracting strap which operates by exerting a clamping pressure against opposite faces of a piece of strap, and which is constructed so that an increase in the clamping pressure exerted on a piece of strap occurs automatically upon an increase in the resistance offered to the extraction of a piece of strap from a pile of the same (such producing a corresponding increase in the tension of the strap where it extends between the pile and the means producing its extraction).

More specifically, an object of the invention is to provide means for delivering strap and similar material to cutter mechanism, comprising opposed clamping rollers (for clamping against opposite faces of the strap) where at least one of the rollers has a mounting that accommodates movement of the periphery of the roller toward the cutter mechanism to release the strap (by relaxing the clamping pressure exerted thereon), and movement away from the cutter mechanism and toward the other roller to establish clamping pressure. With such an organization, when a firmer grip is needed on a piece of strap in order to pull the piece of strap from a pile, the strap operates automatically to pull the movable roller toward the other roller, whereby an increase in the clamping pressure exerted by the rollers occurs.

Yet another object of the invention is to provide improved means for feeding strap and similar material to cutter apparatus, which comprises a pair of clamping rollers, with one roller mounted upon a pivotable support whereby the roller may swing away from the cutter mechanism and toward the other roller to produce clamping pressure, and novel means for transmitting power to both rollers whereby both rollers are power-driven.

A further object of the invention is to provide improved stock cutting apparatus, which features a novel organization of cutter mechanism and hollow housing structure surrounding the cutter mechanism, constructed so that stock on being cut travels downwardly in the housing structure and through a discharge opening in the base thereof, the latter being adapted to be placed in communication with the interior of some container or receptacle, such as a barrel. The apparatus contemplated is particularly well suited for manufacture as a unit which in operation rests on the top of a barrel, and which may be transported from a position on the top of one barrel to a position on the top of another barrel.

A still further object is to provide novel mechanism in a stock cutter for cutting the stock, including cooperating knife elements that travel past each other in a shearing stroke with the mechanism producing a cut.

These and other objects and advantages are attained by the invention, and the same is described hereinbelow in conjunction with the accompanying drawings, wherein:

FIG. 1 is a perspective view showing cutter apparatus according to one embodiment of the invention, with such in operative position and resting on top of a barrel;

FIG. 2 is a side elevation, on a slightly larger scale, of the apparatus in FIG. 1;

FIG. 3 is an end elevation of the apparatus in FIG. 1;

FIG. 4 is an enlarged, exploded view, showing details of cutter mechanism in the apparatus; and FIG. 5 illustrates in perspective a bracket that is part of the apparatus, such being drawn on a slightly smaller scale than FIGS. 2 and 3.

Referring now to the drawings, and first of all to FIG. 1, a frame for the apparatus is illustrated generally at 10, including a base plate 12, and fastened, to the base plate, as by fasteners 14 (see FIG. 2), a hollow housing structure 16. In the embodiment of the invention illustrated, hollow housing structure 16 comprises a lower housing 16a, an upper housing 16b, and a cover plate 16c (see FIG. 1). These are suitably fastened together, as by fasteners 18. Cover plate 16c covers an opening in the side of the housing structure which is opened up upon removal of the cover plate, to accommodate entry into the housing structure and replacement or repair of certain parts therein if such should be necessary.

Suitably fastened over the front of the housing structure is a guard 20 (the apparatus being shown with this removed in FIGS. 2 and 3). The guard has a funnel opening 22 in the forward wall thereof, through which strap material is fed into the stock cutter.

The stock cutter illustrated in the drawings is portable, in the sense that the apparatus has a construction enabling it to be mounted on the top of a barrel or other container for receiving cut-up stock, and to be moved off the top of such a container and onto another one when the first container becomes full. Thus, base plate 12 has flanges 24 along the bottom thereof which, as best seen in FIG. 1, may rest on the top of a barrel 25 with the apparatus in operative position. An opening 26 (see FIG. 2) is provided in the base plate, in the area bounded by housing structure 16, and pieces after being cut from a piece of strap travel downwardly and into the barrel or container beneath the apparatus by falling through this opening. An eye 27 joined to the top of housing structure 16 is provided to facilitate lifting the apparatus when it is to be moved from one location to another.

Cutter mechanism 28 is provided within the housing structure, which is operable when actuated to cut up strap into small pieces. Such cutter mechanism will now be described in more complete detail.

As best seen in FIG. 2, journaled in opposite walls of housing structure 16 is a shaft 30. Shaft 30 has a knife holder 32 mounted thereon (see also FIG. 4) which is keyed to the shaft by a key 34 so as to rotate with the shaft. A movable knife 36 is secured in place on the knife holder, using fasteners 37. The knife fits within a ledge 40 provided on a part of the knife holder disposed radially outwardly of shaft 30.

Knife 36, it will be noted, comprises an elongated body of substantially square cross section. A cutting edge extends along each of the four corners 36a, 36b, 36c, and 36d of the knife. The knife is removable by removing fasteners 38, and on proper positioning of the knife on the knife holder, any one of these four cutting edges may be used in cutting stock. With the knife as shown in FIG. 2, edge 36d is the operative cutting edge. Edge 36b may be made the operative cutting edge, by turning the knife over 180° about its longitudinal axis. Edge 36c may be made the operative cutting edge, by flipping the knife 180° about a transverse axis from the position shown in FIG. 2. Edge 36a may be made the operative cutting edge, by turning the knife 180° about its longitudinal axis after it has thus been flipped over.

Secured to a wall of lower housing 16a, and occupying a substantially horizontal position, is another knife 38, which is stationary. This knife is fastened in place using fasteners 41. This knife, like knife 36, also comprises a body of substantially square cross section, and a cutting edge is provided along each of its four corners 38a, 38b, 38c, and 38d, which may be placed in operative cutting position by manipulation of the knife in a manner similar to one described in connection with knife 36.

Knife 36 when properly mounted on knife holder 32 (and shaft 30) is revolvable about an axis spaced to one side of knife 38 (the longitudinal avis of shaft 30). The mounting for knife 36 is such that upon rotation of shaft 30, knife 36 travels past knife 38 in a shearing or slicing type of stroke one for each 360° rotation of shaft 30.

Shaft 30 is rotated by means of motor 42 mounted on base plate 12 and disposed to one side of the housing structure. Motor 42 has an output shaft 44 connected to a sheave 46. Mounted on shaft 30 outside the housing structure is a flywheel pulley 48. Interconnecting the flywheel pulley and sheave is a belt 50. A flywheel guard 52 may be detachably mounted over the belt and flywheel, for the purpose of safety. Such is shown removed from the apparatus in FIGS. 2 and 3.

Housing 16 has an opening 54 provided in a side thereof (see FIG. 4) through which strap material passes in traveling toward cutter mechanism 28 just described. In the cutter mechanism, the strap material travels over knife 38 and is supported thereon. Each time movable knife 36 comes downwardly and across the side of knife 38, the strap material where it extends over the cutter edge of knife 38 is severed off in a slicing stroke. Movable knife 36 is effective to push a just-severed piece of material downwardly, and thence it falls through the hollow housing structure and opening 26 to any suitable container which is beneath the apparatus.

Mounted to one side of housing structure 16 is means indicated generally at 60 which is effective to extract strap from a pile, and to feed such strap continuously into opening 54 and across knife 38. Means 60, which thus comprises both an extractor and a feed means, will now be described in more detail.

As best shown in FIGS. 2 and 3, mounted on one wall of housing structure 16 by fasteners 63 is a bracket 64. Bracket 64 is shown removed from the apparatus in FIG. 5, and it will be seen by referring to this figure that the bracket includes opposed, lower bracket arm 64a, 64b, and an upper bracket arm 64c. Opposed feed or clamping rollers 66 and 68 are mounted on the apparatus through these arms of bracket 64.

Considering first of all roller 66, this roller is mounted on a shaft 70 extending through the center of the roller. The roller is keyed to the shaft, so that the two rotate as a unit. The ends of shaft 70 are journaled in bracket arms 64a, 64b.

Roller 68 is mounted on bracket 64 through roller support means, more specifically a pair of pivoted arms, indicated at 74, 76. Pivoted arms are journaled on a shaft 78, which is journaled in bracket arm 64c, this shaft, therefore, providing a pivot mounting for the arms. The top ends of the two pivoted arms are interconnected by a plate 80, to which is secured a handle 82.

Journaled in lower portions of pivoted arms 74, 76 is a shaft 84. Roller 68 is mounted on this shaft, with the shaft extending through the center of the roller. The roller and shaft are keyed together for rotation as a unit.

Shaft 78 that pivotally mounts the arms on bracket 64 has a gear 86 secured to one end, and a sprocket or driving member 88 secured to its other end. Shaft 84 that mounts roller 68 has a gear 90 secured to one end (that meshes with gear 86). A sprocket 92 is secured to an end of shaft 70 mounting roller 66. Interconnecting sprockets 88, 92 is a chain 94. In this manner, drive is transmitted from shaft 70 and the lower roller 66 to shaft 78, and through shaft 84 to roller 68.

Lower roller 66 and shaft 70 are driven by motor 42 through a sprocket 96 secured to shaft 70, and a chain 98 extending between sprocket 96 and a sprocket 100 which is connected to a shaft 101. Motor 42 drives shaft 101 through a gear box 102.

As best illustrated in FIG. 2, when handle 82 is swung to the right, such is effective to swing pivoted arms 74, 76 in a clockwise direction, whereby upper roller 68 journaled at the base of the arms has its periphery raised from lower roller 66 and shifted toward cutter mechanism 28. Thus, upon swinging upper roller 68 toward the cutter mechanism, the rollers are separated and any clamping pressure exerted on a piece of stock is relaxed. Upon swinging of arms 74, 76 in a counterclockwise direction by similar shifting of handle 82, upper roller 68 has its periphery swung away from the cutter mechanism and down toward the periphery of lower roller 66. It is this movement of the upper roller which serves to establish clamping pressure between the two rollers.

The rotation axis of roller 68 is indicated at A in FIG. 2, and the pivot axis for arms 74, 76 or the support means for roller 68 is indicated at B. It should be noted that axes A and B define a plane C which parallels rotation axis D of roller 64 and lies between rotation axis D of roller 64 and the feed side of cutter mechanism 28.

A piece of strap such as may be cut up by the stock cutter is indicated at 110 in FIG. 1. Such is shown in the process of being extracted from a pile of such strap pieces entangled with each other and indicated at 112. Because of the mounting of the upper roller, should there be an increase in the resistance offered to the extraction of strap 110 from pile 112 (such causing an increase in the tension of strap 110), this results automatically in an increase in the clamping pressure exerted on the strap by rollers 66, 68. This is because when the tension in the strap increases, upper roller 68 tends to be pulled in the direction of the arrow in FIG. 2, and downwardly toward lower roller 66.

The operation of the stock cutter should be obvious. Describing the operation briefly, initially a piece of strap may be placed through funnel opening 22 and on top of lower roller 66. If desired, roller 68 may first be swung clear of roller 66, by swinging handle 82 to the right in FIG. 2 against the spring tension of a spring 83. With the strap against the lower roller, handle 82 may be released, to enable spring 83 to bring upper roller 68 downwardly toward the lower roller. With motor 42 running, the cutter mechanism is actuated, and rollers 66, 68 are rotated so as to extract the strap from the pile, and feed such extracted strap into the cutter mechanism. As the strap is fed into the cutter mechanism, movable knife 36 cuts off successive pieces, which fall after cutting downwardly through the hollow housing structure and opening 26 into the container below the apparatus. The operation is continuous, with the lengths of the pieces cut depending upon the relation between knife speed and the speed at which the rollers are rotated.

The apparatus has a number of unique advantages. For one thing, it has little bulk and is readily moved from one location to another. The cutter mechanism is devoid of reciprocating parts. The knife elements in the cutter mechanism may be used for long periods of time without replacement, and are easily repositioned to change their operative cutting edges. The housing structure functions to channel cut pieces downwardly during their travel from the cutter mechanism to the container positioned below the apparatus. The clamping rollers are both power-driven, and tend automatically to clamp more firmly onto a piece of strap when greater clamping pressure is needed to free the strap from a pile in which the strap has been collected.

While an embodiment of the invention has been described, changes and reorganizations are possible without departing from the invention. It is desired to cover all variations and modifications of the invention that would be apparent to one skilled in the art, and that come within the scope of the appended claim.

It is claimed and desired to secure by Letters Patent:
In a stock cutter,
a frame, and cutter mechanism mounted on said frame operable to cut stock into pieces when a continuous ribbon of stock is fed thereinto,
said cutter mechanism comprising a fixed knife element, a movable knife element, and a knife holder supporting the movable knife element whereby the latter may be moved in a circular sweep about an axis that extends transversely of both the fixed and movable knife elements and that is disposed to one side of said fixed knife element with such movement producing in the movable knife element a scissor-type shearing stroke on each sweep of the movable knife element,
said movable knife element comprising an elongated four-cornered body of substantially rectangular cross section having a cutting edge along each of the four corners thereof which is straight and parallel to each of the other three edges, and faces bounding said body joining adjacent pairs of cutting edges,
said cutter mechanism further including means detachably mounting the movable knife element on said knife holder enabling positioning of the movable knife element with any of its four cutting edges leading the element during a shearing stroke and with a face of the element which joins with such cutting edge facing the fixed knife element and in the plane defined by the sweep of the movable knife element.

References Cited by the Examiner

UNITED STATES PATENTS

| | | | |
|---|---|---|---|
| 1,363,778 | 12/1920 | Griffin | 83—355 |
| 2,051,491 | 8/1936 | Lockett et al. | 83—350 |
| 2,226,130 | 12/1940 | Kinsella | 83—355 |
| 2,320,659 | 6/1943 | Sahlin | 83—422 |
| 2,338,132 | 1/1944 | Sandberg | 83—355 |
| 2,814,345 | 11/1957 | Repper | 83—355 |
| 2,953,955 | 9/1960 | Underhill | 83—355 |
| 2,957,379 | 10/1960 | Sidebottom et al. | 83—422 |
| 3,143,766 | 8/1964 | Rohn | 83—355 X |

FOREIGN PATENTS 266,021   10/1913   Germany.

WILLIAM W. DYER, JR., *Primary Examiner.*

LEON PEAR, ANDREW R. JUHASZ, *Examiners.*

LEIGH B. TAYLOR, *Assistant Examiner.*